US012508599B2

(12) United States Patent
Gnam

(10) Patent No.: US 12,508,599 B2
(45) Date of Patent: Dec. 30, 2025

(54) MATERIAL PROCESSING DEVICE, IN PARTICULAR CRUSHER

(71) Applicant: Kleemann GmbH, Göppingen (DE)

(72) Inventor: Michael Gnam, Blaubeuren (DE)

(73) Assignee: Kleemann GmbH, Göppingen (DE)

( * ) Notice: Subject to any disclaimer, the term of this patent is extended or adjusted under 35 U.S.C. 154(b) by 369 days.

(21) Appl. No.: 18/452,429

(22) Filed: Aug. 18, 2023

(65) Prior Publication Data

US 2024/0066523 A1 Feb. 29, 2024

(30) Foreign Application Priority Data

Aug. 29, 2022 (DE) ..................... 10 2022 121 783.3

(51) Int. Cl.
*B02C 13/30* (2006.01)
*B02C 13/02* (2006.01)
*B02C 21/02* (2006.01)

(52) U.S. Cl.
CPC .............. *B02C 13/30* (2013.01); *B02C 13/02* (2013.01); *B02C 21/026* (2013.01)

(58) Field of Classification Search
CPC ........ B02C 13/30; B02C 13/26; B02C 21/026
See application file for complete search history.

(56) References Cited

U.S. PATENT DOCUMENTS 10,272,905 B2 * 4/2019 Vyncke ................. B60W 10/06
2021/0079837 A1 3/2021 Crankshaw et al.
2021/0277629 A1 9/2021 Fanning et al.
2023/0060871 A1 * 3/2023 Crankshaw ............. F02B 63/04

FOREIGN PATENT DOCUMENTS

DE 19953857 A1 5/2001
DE 102010012667 A1 9/2011
EP 3804859 A2 4/2021
EP 3869662 A1 8/2021

OTHER PUBLICATIONS

German office action for patent application No. 10 2022 121 783.3, dated May 25, 2023, 8 pages (not prior art).
European Search Report for corresponding patent application 23190235.4, dated Jan. 12, 2024, 9 pages (not prior art).

* cited by examiner

*Primary Examiner* — Bobby Yeonjin Kim
(74) *Attorney, Agent, or Firm* — Lucian Wayne Beavers; Patterson Intellectual Property Law PC

(57) ABSTRACT

A crusher includes an internal combustion engine, a crusher unit and a drive train connecting the internal combustion engine and the crusher unit. The drive train includes a motor coupling, a crusher unit coupling and a motor generator. The motor generator includes a motor rotor and a motor stator. The motor rotor includes a motor generator shaft coupled to both an output end of the motor coupling and an input end of the crusher unit coupling in a rotationally fixed manner. The motor generator has a motor mode of operation in which the motor generator provides mechanical work for driving the crusher unit. The motor generator has a generator mode of operation in which the motor generator is driven by the internal combustion engine to generate electrical power.

9 Claims, 4 Drawing Sheets

MATERIAL PROCESSING DEVICE, IN PARTICULAR CRUSHER

RELATED APPLICATIONS

The present application claims priority to German Patent Application Ser. No. DE 10 2022 121 783.3 filed Aug. 29, 2022, which is incorporated herein by reference.

BACKGROUND OF THE DISCLOSURE

Field of the Disclosure

The invention relates to a material processing device, in particular a crusher, for crushing mineral material, having an internal combustion engine which can be mechanically coupled to a crusher unit via a drive train to drive the latter, the drive train having a motor coupling by means of which the internal combustion engine can be selectively coupled to the drive train for transferring drive power or decoupled therefrom, wherein the drive train comprises a crusher unit coupling by means of which the crusher unit can be selectively coupled to or uncoupled from the drive train, and wherein the drive train comprises a motor generator comprising a motor rotor and a motor stator, which, in a motor mode of operation (motor operation), provides mechanical work for driving the crusher unit and which, in a generator mode of operation (generator operation), is driven by the internal combustion engine to generate electrical power.

Material processing devices in terms of the invention can be crushers, in particular rotary impact crushers, cone crushers or jaw crushers.

Description of the Prior Art

From EP 3 804 859 (U.S. 2021079837) a material processing device is known, which can be used for crushing mineral material. This material processing device has an internal combustion engine that drives a transmission via a free-wheel clutch. A further coupling is provided at an output of the transmission. Downstream of this further coupling, a belt drive is used to drive a crusher unit. The transmission has two output shafts. Each of these output shafts drives a motor generator. If the internal combustion engine provides drive power during operation, it is made available to the crusher unit via the drive train, which comprises the free-wheel clutch, the transmission and the coupling. Part of the drive power of the internal combustion engine is transferred to the motor generators as mechanical work via the output shafts of the transmission. The motor generators produce alternating current, which is converted to direct current in converters. The DC current coming from the converters is then combined in a bus line and fed to a further converter. The further converter converts the direct current back to alternating current and feeds it into a main power circuit of the material processing device. Various motors are connected to the main circuit, which can be supplied with electrical energy in that way. In a second operating mode, electrical energy is fed into the main circuit and supplied to the motor generators via the previously described line system. These motor generators generate mechanical power from the supplied current, which can be fed to the transmission via the drive shafts. In this operating state, the internal combustion engine is switched off so that the mechanical work provided by the motor generators can be transferred to the crusher unit via the drive train. The free-wheel clutch prevents the internal combustion engine from being dragged along in this operating state.

The invention addresses the problem of providing a material processing device of the type mentioned above, which makes for an effective power transmission to the crusher unit in a compact design.

This problem is solved in that the motor rotor of the motor generator comprises a motor generator shaft, in that the motor generator shaft is coupled to the output end of the motor coupling in a rotationally fixed manner, and in that the motor generator shaft is coupled to the input end of the crusher unit coupling in a rotationally fixed manner.

According to the invention, the motor generator can now be installed in the construction area between the motor coupling and the crusher unit coupling to save space. In the generator operating mode, the motor generator shaft transfers the mechanical work supplied thereto by the internal combustion engine, preferably directly, to the crusher unit, resulting in a direct power transmission with low power losses. In the motor operating mode, the power supplied electrically is transferred from the motor generator directly via the motor generator shaft to the crusher unit coupling. Here, too, there are significantly lower power losses compared to the standard design.

According to one variant of the invention, the drive train can be made particularly compact if provision is made for the motor generator shaft to be designed as a shaft passing through the motor generator, one end of which is connected to the motor coupling and at the other end of which is connected to the crusher unit coupling.

The motor generator can be integrated into the drive train in a particularly space-saving manner with little construction effort if, according to a possible design variant of the invention, provision is made for the motor rotor to be coupled to the motor generator shaft in a rotationally fixed manner. For this purpose, provision may be made, for instance, for the motor rotor to have a hub, which is connected to the motor generator shaft in a rotationally fixed manner.

In an alternative design of the motor generator, provision may be made for the motor rotor to be rotatably coupled to the motor generator shaft, preferably by means of a transmission. Because the motor rotor is no longer rigidly connected to the motor generator shaft, the speed between the motor rotor and the motor generator shaft can be reduced. This renders designing the motor generator in a suitable way for a given internal combustion engine feasible, for it to fulfill the assigned tasks in the best possible way.

The design of the transmission works well in a simple manner if provision is made for the motor generator shaft to have or be assigned a toothing, for at least one gear to mesh with the toothing, and for a toothing of the motor rotor to mesh directly with the gear or gears or with the interposition of at least one further gear.

One possible embodiment of the invention is such that the motor rotor of the motor generator is designed in the form of an internal rotor. This makes for a high power density and thus a high torque can be implemented in a small installation space, which supports the compact design desired in accordance with the invention.

According to the invention, provision may further be made for the motor rotor to comprise a rotor winding and for the motor stator to comprise a stator winding, and for the number of windings of the rotor winding and the stator winding to be identical.

The material processing device according to the invention can be designed in such a way, that in the motor operating mode, in which the motor generator provides mechanical work for driving the crusher unit, the motor coupling is opened in such a way that the combustion motor is disconnected from the drive train and the crusher unit coupling is closed, for a torque transmission from the motor generator shaft to the crusher unit, and that the motor generator is supplied with electrical energy via an external voltage supply or an accumulator.

Further, in the generator operating mode, in which the motor generator is driven by the internal combustion engine to generate electric power, provision may be made for the motor coupling to be closed for torque transfer from the internal combustion engine to the motor rotor and the crusher unit coupling to be in the disengaged state, and for the motor stator to be connected to a primary grid of the material processing device, such that alternating current generated by the motor generator is fed into the primary grid in the second operating mode and is supplied to loads, in particular to one or more electric motors connected to the primary grid and/or to one or more hydraulic pumps.

Further, in the generator mode of operation, in which the motor generator is driven by the internal combustion engine to generate electric power, provision may be made for the motor coupling to be closed for torque transfer from the internal combustion engine to the motor rotor and for the crusher unit coupling to be in the engaged state, and in for the motor stator to be connected to a primary grid of the material processing device, such that alternating current generated by the motor generator is fed into the primary grid in the generator operating mode and supplied to loads, in particular to one or more electric motors connected to the primary grid and/or to one or more hydraulic pumps. Because the crusher coupling is also closed, in this mode the crusher unit is driven by the internal combustion engine and the plant is supplied with electrical power via the motor generator as well.

The material processing device may be a mobile device, wherein undercarriages are provided on both sides of the material processing device extending in the direction of travel, and wherein in the second mode of operation, power generated by the motor generator is supplied to traction motors of the undercarriages to enable the driving mode of the material processing device.

In another embodiment of the invention, driving mode may be implemented when the traction motors are not supplied with electrical energy via the external power supply. Then driving mode can be achieved by the internal combustion engine being activated and it feeding electricity into the primary grid via the motor generator, which is then made available to the traction motors to implement driving mode. In particular, it is possible for the internal combustion engine to drive the crusher unit while in driving mode. However, it is of course also feasible for the crusher unit coupling to be open, such that only driving mode is possible and the crusher unit is uncoupled.

According to the invention, driving mode can also be implemented when the internal combustion engine is not active. In that case, provision may be made, for instance, for the traction motors of the undercarriage to be electrically connected to the primary grid in a further operating mode and for the primary grid to be connected to an external power supply. The traction motors can be directly electrical (the electric motor drives the traction gear) or electrohydraulic (the electric motor drives a hydraulic pump).

BRIEF DESCRIPTION OF THE DRAWINGS

The invention is explained in greater detail below based on exemplary embodiments shown in the drawings. In the figures.

DETAILED DESCRIPTION

Figure 1:
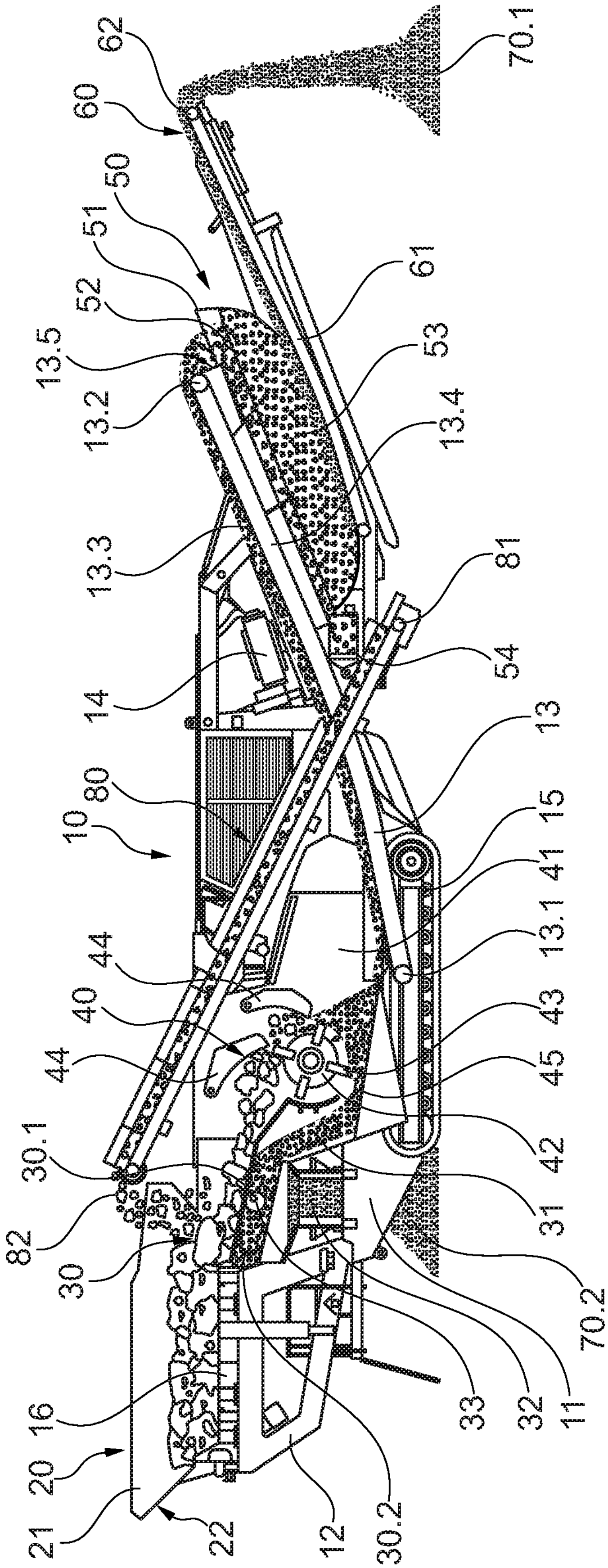
FIG. 1 shows a schematic side view of a crusher.

FIG. 1 shows a processing plant in the form of a crusher 10. The crusher 10 is designed as a mobile crusher and therefore has undercarriages 15. However, it is also conceivable that the crusher 10 is a stationary crusher.

The crusher 10 has a chassis 11 that supports the machine components or at least a part of the machine components. At its rear end, the chassis 11 has a cantilever 12. A material feed area is formed in the area of the cantilever 12.

The material feed area includes a feed hopper 20 and a material feed device 16.

The feed hopper 20 may be formed at least in part by hopper walls 21 extending in the longitudinal direction of the crusher 10 and a rear wall 22 extending transversely to the longitudinal direction. The feed hopper 20 leads to the material feed device 16.

As shown in this exemplary embodiment, the material feed device 16 may have a conveyor chute that can be driven by means of a vibratory drive. The feed hopper 20 can be used to feed material to be broken into the crusher 10, for instance using a wheel loader, and to feed it onto the conveyor chute.

From the conveyor chute, the material to be broken passes into the area of a screen unit 30. This screen unit 30 may also be referred to as a pre-screening arrangement. At least one screen deck 30.1, 30.2 is disposed in the area of the screen unit 30. In this exemplary embodiment two screen decks 30.1, 30. 2 are used.

A partial fraction of the material to be broken is screened out at the upper screen deck 30.1. This partial fraction already has a sufficient particle size that it no longer needs to be broken in the crusher 10. In this respect, this screened out partial fraction can be routed past a crusher unit 40 through a bypass channel 31.

If a second screen deck 30.2 is used in the screen unit 30, a further fine particle fraction can be screened out from the partial fraction that accumulates below the screen deck 30.1. This fine particle fraction is routed to a lateral discharge conveyor 32 below the screen deck 30.2. The fine particle fraction is diverted from the lateral discharge conveyor 32 and conveyed to a rock pile 70.2 located to the side of the machine.

As FIG. 1 illustrates, the screen unit 30 may be a vibrating screen having a screen drive 33. The screen drive 33 causes the screen deck 30.1 and/or the screen deck 30.2 to vibrate. Owing to the inclined arrangement of the screen decks 30.1, 30.2 and in conjunction with the vibration motions, material on the screen decks 30.1, 30.2 is transported towards the crusher unit 40 or towards the bypass channel 31.

The material to be broken routed from the screen deck 30.1 is routed to the crusher unit 40, as shown in FIG. 1.

The crusher unit 40 may be designed to be a rotary impact crusher unit. However, it may also be another crusher unit, for instance a jaw crusher unit of a jaw crusher, a cone crusher unit of a cone crusher, or a roll crusher unit of a roll crusher.

The crusher unit 40 has a crushing rotor 42 driven by an internal combustion engine 41. In FIG. 1, the axis of rotation of the crushing rotor 42 is horizontal in the direction of the image depth.

For instance, the outer periphery of the crushing rotor 42 may be equipped with impact bars 43. Opposite from the crushing rotor 42, for instance, wall elements may be disposed, preferably in the form of impact rockers 44.

When the crushing rotor 42 is rotating, the impact bars 43 throw the material to be broken outwards. In so doing, this material hits the impact rockers 44 and is broken due to the high kinetic energy. When the material to be broken is of sufficient particle size to allow the material particles to pass through the gap between the impact rockers 44 and the radially outer ends of the impact bars 43, the broken material exits the crusher unit 40 through the crusher outlet 45.

It is conceivable that in the area of the crusher outlet 45, the broken material routed from the crusher unit 40 is combined with the material routed from the bypass channel 31 and transferred onto a belt conveyor 13. The belt conveyor 13 can be used to convey the material out of the working area of the crusher unit 40.

As shown in the drawings, the belt conveyor 13 may comprise an endless circulating conveyor belt having a slack side 13.3 and a tight side 13.4. The slack side 13.3 is used to catch and transport away the crushed material falling from the crusher outlet 45 of the crusher unit 40. At the belt ends, deflection rollers 13.1, 13.2 can be used to deflect the conveyor belt from the slack side 13.3 to the tight side 13.4 and vice versa. Guides, in particular support rollers, can be provided in the area between the deflection rollers 13.1, 13.2 to change the conveying direction of the conveyor belt, to shape the conveyor belt in a certain way and/or to support the conveyor belt.

The belt conveyor 13 has a belt drive, which can be used to drive the belt conveyor 13. The belt drive can preferably be disposed at the discharge end 13.5 or in the area of the discharge end 13.5 of the belt conveyor 13.

The belt conveyor 13 can be connected, for instance by means of the belt drive, to a control device by means of a control line.

One or more further belt conveyors 60 and/or a return conveyor 80 may be used, which in principle have the same design as the belt conveyor 13. In this respect, reference can be made to the above statements.

A magnet 14 can be disposed above the slack side 13.3 in the area between the feed end and the discharge end 13.5. The magnet 14 can be used to lift iron parts from the broken material and move them out of the conveying area of the belt conveyor 13.

A re-screening device 50 can be disposed downstream of the belt conveyor 13. The crusher unit 50 has a screen housing 51, in which at least one screen deck 52 is mounted. Below the screen deck 52, a housing base 53 is formed, which is used as a collection space for the material screened out at the screen deck 52.

An opening in the lower housing part creates a spatial connection to the further belt conveyor 60. Here, the further belt conveyor 60 forms its feed area 61, wherein the screened material in the feed area 61 is directed onto the slack side of the further belt conveyor 60. The further belt conveyor 60 conveys the screened material towards its discharge end 62. From there, the screened material is transferred to a rock pile 70.1.

The material not screened out at the screen deck 52 of the re-screening device 50 is conveyed from the screen deck 52 onto a branch belt 54. The branch belt 54 can also be designed as a belt conveyor, i.e., reference can be made to the explanations given above with respect to the belt conveyor 13. In FIG. 1, the transport direction of the branch belt 54 extends in the direction of the image depth.

At its discharge end, the branch belt 54 transfers the un-screened material, also referred to as oversize material, to the feed area 81 of the return conveyor 80. The return conveyor 80, which may be a belt conveyor, conveys the oversize material towards the feed hopper 20. At its discharge end 82, the return conveyor 80 transfers the oversize material into the material flow, specifically preferably into the material feed area. The oversize material can therefore be returned to the crusher unit 40 and crushed to the desired particle size.

Figure 2:
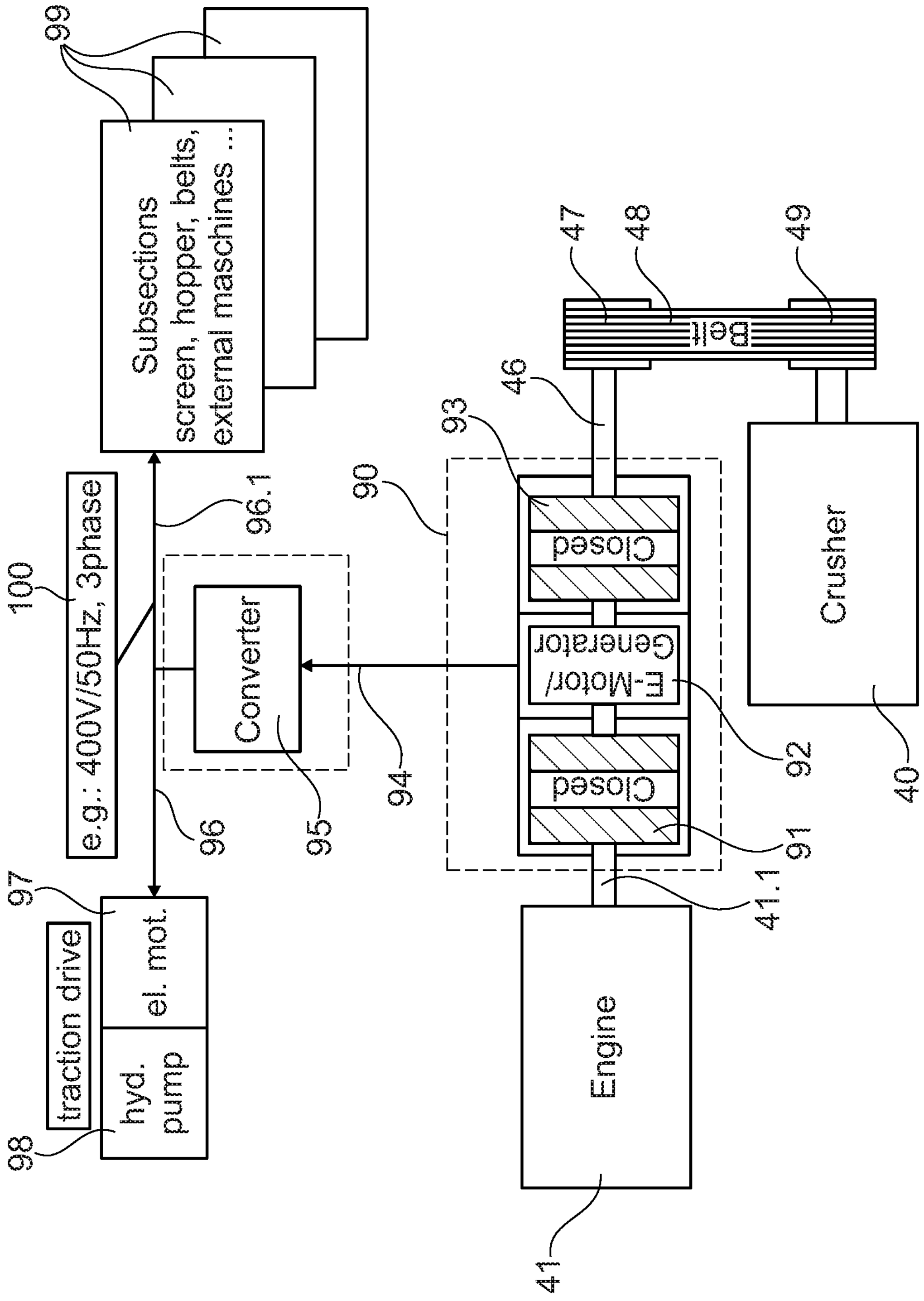
FIG. 2 shows a schematic block diagram of a part of the crusher of FIG. 1 in a generator mode of operation.

FIG. 2 shows a schematic diagram of the internal combustion engine 41, which drives a drive train 90 via a drive shaft 41.1. The drive train 90 leads to a belt drive, which can be used to drive the crusher unit 40. The belt drive can be of conventional design and has two deflection pulleys 47, 49 around which an endless circulating belt 48 is guided.

The drive train 90 comprises a motor coupling 91, a motor generator 92, and a crusher unit coupling 93.

On its input end the motor coupling 91 is coupled to the drive shaft 41.1 of the internal combustion engine 41 in a rotationally fixed manner. The output end of the motor coupling 91 is connected to the motor generator 92 and coupled thereto on the input end.

On the output end of the motor generator 92, the crusher unit coupling may be coupled at the input end in a rotationally fixed manner. The output end of the crusher unit coupling 93 is connected directly or indirectly (indirectly, as in this example by means of the belt drive) to the crusher unit 40.

The motor generator 92 is connected to an electric connection 94. This electrical connection 94 can be used to dissipate the current generated by the motor generator 92 or current can be supplied to the motor generator 92 if it is to be operated as an electric motor.

The electrical connection 94 may be coupled to a converter 95. The converter 95, in turn, is connected to a primary grid 96 of the crushing plant 10.

The converter 95 is designed to convert the current supplied thereto by the motor generator 92 into a form suitable for the primary grid 96. Conceivably, the converter 95 is also adapted to convert the power provided by the primary grid 96 into a suitable form to provide power to the motor generator 92.

Electrical loads of the material processing device are connected to the primary grid 96. For instance, one or more electric motors, for instance for the hydraulic system 97/98 also as direct electric motors 99, can be connected to drive the material feed device 16 (for instance the vibration drive), the screen unit (for instance the screen drive), the belt drives of the belt conveyors, the rescreening device 50 and/or another working machine (not shown) as electrical loads. It is also conceivable that the electric traction motors of the undercarriage 15 are connected to the primary grid 96. In addition or alternatively, provision may also be made for the magnet 15 or other electric loads to be connected.

FIG. 2 also illustrates that an external power supply 100 may be coupled to the primary grid 96. The external power supply 100 may be a battery or the public power grid.

FIG. 2 illustrates a generator mode of operation of the material processing device. In this operating mode, the internal combustion engine 41 is activated and generates mechanical work at its drive shaft 41.1. The motor coupling 91 and the coupling of the crusher 93 are closed. In this way, the internal combustion engine 41 can transfer the mechanical work it generates to the drive shaft 46. The mechanical work is transferred to the crusher unit 40 via the belt drive to perform crushing work as intended using the crusher unit 40.

At the same time, the internal combustion engine 41 may also drive the motor generator 92. In that way, the motor generator 92 generates a current, which is routed to the converter 95 via the electrical connection 94. The converter 95 converts the current supplied thereto into a suitable form and routes it into the primary grid 96. In the primary grid 96, the electricity is then made available to one or more of the electrical loads mentioned above.

Figure 3:
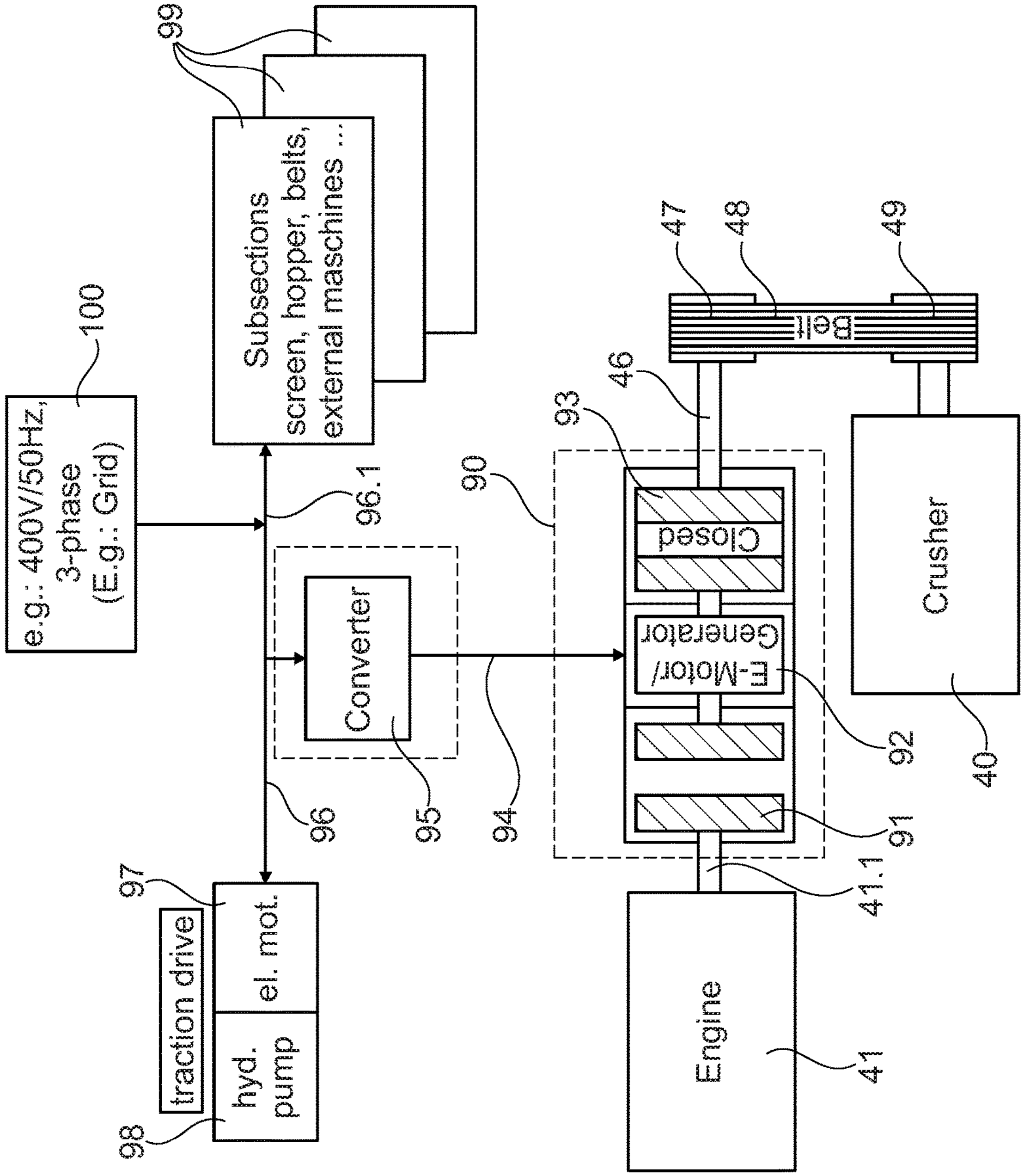
FIG. 3 shows the representation of FIG. 2 in a motor mode of operation.

FIG. 3 shows a motor operating mode. As this representation indicates, power is supplied to the primary grid 96 via the external power supply 100. This power may be provided to one or more of the electrical loads mentioned above via the primary grid 96. In addition, the current supplied by the external power supply may also be supplied to the converter 95. The converter 95 transfers the current into a suitable form to make it available to the motor generator 92. The motor generator 92 generates mechanical drive power via the current supplied thereto. This mechanical drive power is transferred to the crusher unit coupling 93, which is in the engaged state. In this way, mechanical work can be provided to the belt drive, and thus to the crusher 40, via the output shaft 46 for the former to be able to perform its intended operation.

In particular, in the motor operating mode, the motor coupling 91 may be open. This prevents the internal combustion engine 41, which is deactivated in the motor operating state, from being dragged along.

FIG. 3 illustrates that a driving mode is also possible in the motor operating mode. Electric current is supplied to the traction motors of the undercarriages 15 via the external power supply 100 for this purpose. A switch (not shown) may be used to interrupt the electrical connection from the primary grid 96 to the motor generator 92 in this state. However, it is also conceivable that crushing is performed in driving mode. In this state, the electrical connection from the primary grid 96 to the motor generator 92 is established, such that the latter generates mechanical drive power, which, when the crusher unit coupling 93 closed, is transferred to the crusher unit 40.

FIG. 2 illustrates that a driving mode is also possible in generating operating mode. In that case, the electrical power generated by the motor generator 92 is provided to the traction motors of the undercarriages 15. However, if no crushing operation is desired in driving mode, the crusher unit coupling 93 may be opened, thereby disconnecting the crusher unit 40 from the drive train 90.

Figure 4:
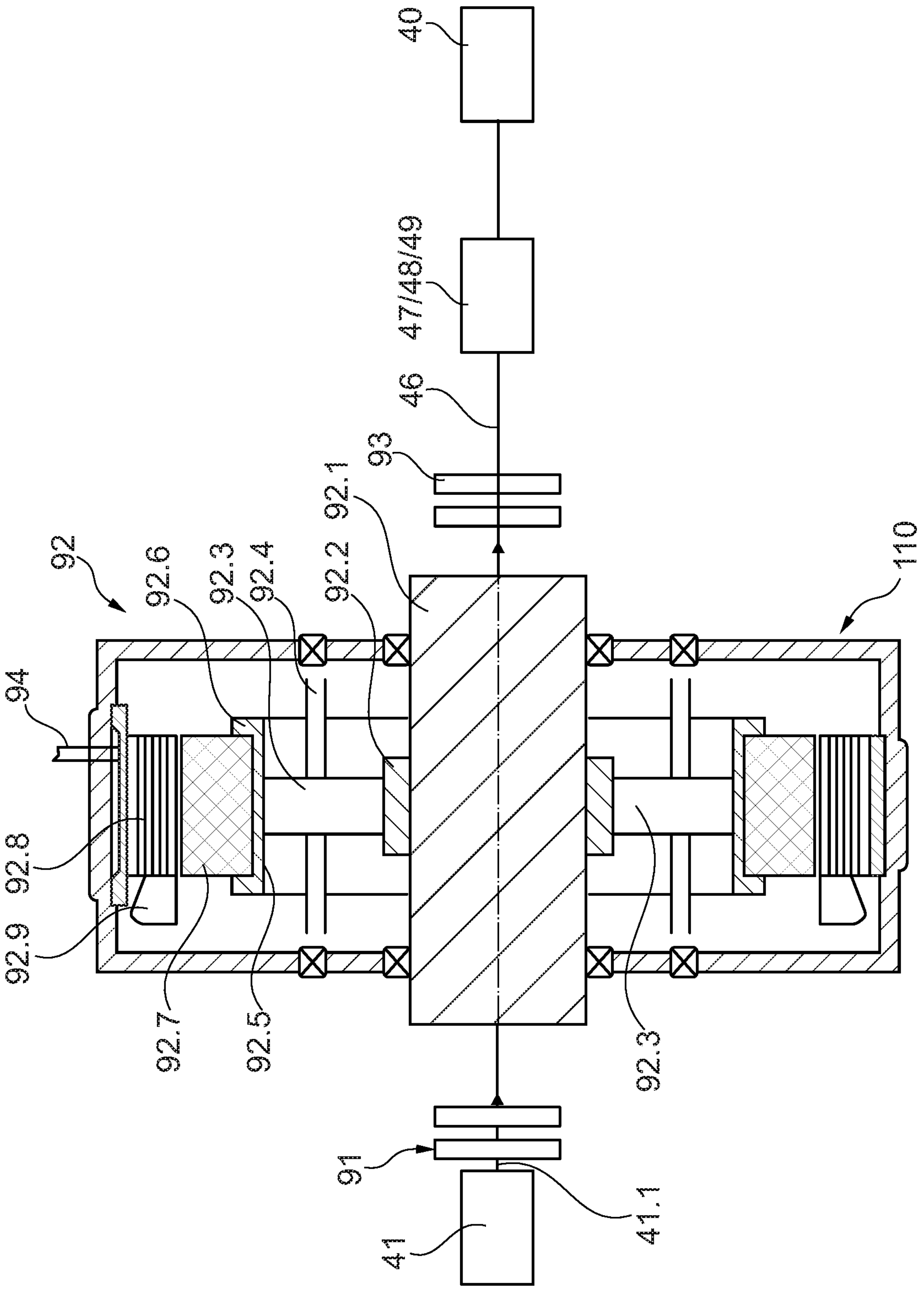
FIG. 4 shows a schematic diagram of a drive train of the crusher of FIGS. 1-3

FIG. 4 illustrates a possible design of the motor generator 92. As this representation illustrates, the motor generator 92 has a housing 110. The motor generator 92.1 is rotatably mounted inside this housing 110. A circumferential toothing 92.2 is connected to the motor generator shaft 92.1, or the motor generator shaft 92.1 has such a circumferential toothing 92.2. At least one gear 92.3 meshes with this toothing 92.2. The gear 92.3 is also rotatably mounted in the housing 110, for instance by means of a bearing shaft 92.4 mounted at its opposite ends. Provision may now be made for at least one further gear to mesh with the gearwheel(s) 92.3. This at least one further gear or the gear 92.3 meshes with a set of teeth 92.5 of a motor rotor 92.6 of the motor generator 92. For this purpose, the motor rotor 92.6 can be designed as a hollow shaft, for instance.

Thus, the toothing 92.2, the one or more gears 92.3, and optionally the other gears form a gear reduction that can be used to step down the speed between the motor generator shaft 92.1 and the motor rotor 92.6.

As FIG. 4 further illustrates, provision may be made for the motor rotor 92.6 to bear a rotor winding 92.7. This rotor winding 92.7 faces a motor stator 92.8 which is attached to the housing. The motor stator 92.8 includes a motor stator winding 92.9 electrically connected to the connection 94.

Instead of the setup shown in FIG. 4, it is also possible that no speed reduction/increase takes place between the motor generator shaft 92.1 and the motor rotor 92.6. For this purpose, provision may be made for the motor generator shaft 92.1 to be connected to the motor generator 92.6 in a rotationally fixed manner, for instance via a hub.

FIG. 4 illustrates that the motor generator shaft 92.1 may be connected, preferably directly, to the output end of the motor coupling 91 and also, preferably directly, to the input end of the crusher unit coupling 93. Thus, the motor generator shaft 92.1 may be a shaft that passes through the motor generator 92.

When the motor generator 92 is operated as an electric motor, current is supplied to the motor stator 92.8 via the connection 94. This induces a magnetic field which causes the motor rotor 92.6 to rotate. This rotational motion is either transferred indirectly into the motor generator shaft 92.1 via the gear(s) 92.3 and the toothing 92.2, or the rotation is transferred directly into the motor generator shaft 92.1. When the motor coupling 91 is open, the motor generator 92, operating as an electric motor, can then drive the belt drive and thus the crusher unit 40 via the closed crusher unit coupling 93 and the drive shaft 46.

If the motor generator 92 is to be operated in generator mode, the internal combustion engine 41 is activated and the motor coupling 91 is closed. This causes the motor generator shaft 92.1 to be driven by means of the internal combustion engine 41 and the motor rotor 92.6 to be set in rotary motion. Due to the effective electromagnetic field between the motor rotor 92.6 and the motor generator 92.8, the current generated in the motor stator 92.8 is transferred via the connection 94. In this operating state, either the crusher unit coupling 93 can be open or it is also conceivable that the crusher unit 40 is operated when the crusher unit coupling is closed.

The invention claimed is:

1. A crusher for crushing mineral materials, comprising:

an internal combustion engine;

a crusher unit; and a drive train for mechanically coupling the internal combustion engine to the crusher unit to drive the crusher unit, the drive train including:

a motor coupling configured to selectively couple the internal combustion engine to the drive train, the motor coupling including an output end;

a crusher unit coupling configured to selectively couple the crusher unit to the drive train, the crusher unit coupling including an input end; and a motor generator including a motor rotor and a motor stator, the motor rotor including a motor generator shaft coupled to both the output end of the motor coupling and to the input end of the crusher unit coupling in a rotationally fixed manner;

the motor generator having a motor mode of operation in which the motor generator provides mechanical work for driving the crusher unit, and the motor generator having a generator mode of operation in which the motor generator is driven by the internal combustion engine to generate electrical power;

wherein the motor rotor is coupled to the motor generator shaft by a transmission so that the motor rotor is rotatable relative to the motor generator shaft, and the motor generator shaft includes a first toothing, the motor rotor includes a second toothing, the motor generator further includes a gear meshing with the first toothing, and the second toothing of the motor rotor meshes with the gear directly or with the interposition of at least one further gear.

2. The crusher for crushing mineral materials of claim 1, wherein:

the motor generator shaft passes through the motor generator and includes one end connected to the motor coupling and another end connected to the crusher unit coupling.

3. The crusher for crushing mineral materials of claim 1, wherein:

the motor rotor is an internal rotor.

4. The crusher for crushing mineral materials of claim 1, wherein:

the motor rotor includes a rotor winding;

the motor stator includes a stator winding; and a number of windings of the rotor winding is identical to a number of windings of the stator winding.

5. The crusher for crushing mineral materials of claim 1, wherein in the motor mode of operation:

the motor coupling is open such that the internal combustion engine is uncoupled from the drive train;

the crusher unit coupling is closed such that the motor generator shaft is coupled to the crusher unit for torque transmission from the motor generator shaft to the crusher unit; and the motor generator is supplied with electrical energy to drive the motor generator shaft.

6. The crusher for crushing mineral materials of claim 1, further comprising:

one or more electric motors;

a primary grid connected to the one or more electric motors; and wherein in the generator mode of operation:

the motor coupling is closed for torque transfer from the internal combustion engine to the motor rotor;

the crusher unit coupling is open such that the crusher unit is uncoupled from the drive train; and the motor stator is connected to the primary grid such that alternating current generated by the motor generator is fed into the primary grid and supplied to the one or more electric motors.

7. The crusher for crushing mineral materials of claim 1, further comprising:

one or more electric motors;

a primary grid connected to the one or more electric motors; and wherein in the generator mode of operation the motor coupling is closed for torque transfer from the internal combustion engine to the motor rotor, the crusher unit coupling is closed for torque transfer from the motor rotor to the crusher unit, and the motor stator is connected to the primary grid such that alternating current generated by the motor generator is fed into the primary grid and supplied to the one or more electric motors.

8. The crusher for crushing mineral materials of claim 1, further comprising:

undercarriages on both sides of the crusher and extending in a direction of travel, each of the undercarriages including a traction motor; and wherein in the generator mode of operation power generated by the motor generator is supplied to the traction motors of the undercarriages to drive the crusher across a ground surface.

9. The crusher for crushing mineral materials of claim 8, further comprising:

a primary grid; and wherein the traction motors are electrically connected to the primary grid and the primary grid is connected to an external power supply.

* * * * *